United States Patent
Lasch

(10) Patent No.: US 10,876,618 B2
(45) Date of Patent: Dec. 29, 2020

(54) DEVICE AND METHOD FOR ACTIVATING A SYNCHRONOUS MACHINE ARRANGED IN A VEHICLE

(71) Applicant: Bayerische Motoren Werke Aktiengesellschaft, Munich (DE)

(72) Inventor: Martin Lasch, Freising (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 78 days.

(21) Appl. No.: 16/162,578

(22) Filed: Oct. 17, 2018

(65) Prior Publication Data
US 2019/0048990 A1    Feb. 14, 2019

Related U.S. Application Data

(63) Continuation of application No. PCT/EP2017/055577, filed on Mar. 9, 2017.

(30) Foreign Application Priority Data

Apr. 21, 2016  (DE) .................. 10 2016 206 765

(51) Int. Cl.
*F16H 57/04* (2010.01)
*B60K 1/00* (2006.01)
*B60K 17/16* (2006.01)

(52) U.S. Cl.
CPC ........... *F16H 57/0413* (2013.01); *B60K 1/00* (2013.01); *F16H 57/0476* (2013.01);
(Continued)

(58) Field of Classification Search
CPC .... B60K 17/16; B60K 1/00; B60K 2001/008; F16H 57/0413; F16H 57/0476; Y02T 10/7258
See application file for complete search history.

(56) References Cited

U.S. PATENT DOCUMENTS

| | | | | |
|---|---|---|---|---|
| 7,466,053 B1* | 12/2008 | Radev | ................ | H02K 1/32 310/114 |
| 2008/0001570 A1* | 1/2008 | Gaetani | ................ | H02P 6/08 318/721 |

(Continued)

FOREIGN PATENT DOCUMENTS

| | | |
|---|---|---|
| DE | 10 2008 001 607 A1 | 11/2009 |
| DE | 10 2011 115 279 A1 | 12/2012 |

(Continued)

OTHER PUBLICATIONS

International Search Report (PCT/ISA/210) issued in PCT Application No. PCT/EP2017/055577 dated May 30, 2017 with English translation (four (4) pages).

(Continued)

*Primary Examiner* — George C Jin
*Assistant Examiner* — Teuta B Holbrook
(74) *Attorney, Agent, or Firm* — Crowell & Moring LLP

(57) ABSTRACT

A device is provided for activating a synchronous machine arranged in a vehicle. The vehicle has a gearbox and driven wheels in operative connection therewith. The synchronous machine is designed to drive the driven wheels via the gearbox. In the vehicle there is a lubricating unit, which is designed to lubricate the gearbox by way of a lubricant, for this purpose the lubricant flowing through the gearbox and at least part of the synchronous machine. The device is configured to operate the synchronous machine in a heating operating mode, which is different from a customary driving operating mode, when there are defined conditions that require heating when starting. At least one operating variable of the synchronous machine is set in the heating operating mode specifically such that, in the synchronous machine, there is a greater current heat loss in comparison (Continued)

with the customary driving operating mode, in order in this way to heat up the lubricant in the heating operating mode.

10 Claims, 3 Drawing Sheets

(52) U.S. Cl.
  CPC ........ *B60K 17/16* (2013.01); *B60K 2001/008* (2013.01); *Y02T 10/72* (2013.01)

(56) References Cited

U.S. PATENT DOCUMENTS

2011/0095717 A1* 4/2011 Takizawa .................. B60L 1/06
    318/473
2017/0194844 A1* 7/2017 Wu .......................... H02K 3/12

FOREIGN PATENT DOCUMENTS

| | | |
|---|---|---|
| DE | 10 2014 211 4447 A1 | 12/2015 |
| EP | 2 667 053 A2 | 11/2013 |
| WO | WO 2015/190621 A1 | 12/2015 |

OTHER PUBLICATIONS

German-language Written Opinion (PCT/ISA/237) issued in PCT Application No. PCT/EP2017/055577 dated May 30, 2017 (eight (8) pages).
German-language Search Report issued in counterpart German Application No. 102016206765.6 dated Mar. 22, 2017 with partial English translation (14 pages).

\* cited by examiner

DEVICE AND METHOD FOR ACTIVATING A SYNCHRONOUS MACHINE ARRANGED IN A VEHICLE

CROSS REFERENCE TO RELATED APPLICATIONS

This application is a continuation of PCT International Application No. PCT/EP2017/055577, filed Mar. 9, 2017, which claims priority under 35 U.S.C. § 119 from German Patent Application No. 10 2016 206 765.6, filed Apr. 21, 2016, the entire disclosures of which are herein expressly incorporated by reference.

BACKGROUND AND SUMMARY OF THE INVENTION

The invention relates to a device and a method for activating a synchronous machine arranged in a vehicle.

Nowadays, vehicles incorporating an electric drive system are being marketed to an increasing extent. These may be hybrid vehicles or electric vehicles. Hybrid or electric vehicles incorporate a drive motor in the form of an electric machine, which is supplied with electrical energy from a high-voltage supply unit. In a hybrid vehicle, in addition to the electric machine, a further unit is employed for propulsion, generally a combustion engine. Conversely, an electric vehicle is driven exclusively by an electric machine. Electric machines employed are generally configured as internal-rotor motors, in which a rotatably-mounted rotor is enclosed in a stationary stator. As drive motors, synchronous machines can be employed, which are either of a permanently-excited or a current-excited design. A high-voltage supply unit employed in the automobile sector can deliver a voltage level of 250 to 420 volts, or even up to 1000 volts. In order to achieve this voltage level, a high-voltage supply unit is comprised of a large number of energy storage cells. Lithium-ion storage cells are customarily employed for this purpose. A high-voltage supply unit of this design is also described as a high-voltage store or a traction battery.

The hybrid or electric vehicle considered in the context of the present invention incorporates a gearbox, and driven wheels in operative connection therewith. The synchronous machine is designed to drive the driven wheels via the gearbox. A lubrication device is additionally provided, which is designed to lubricate the gearbox by means of a lubricant wherein, to this end, the lubricant flows through the gearbox. In vehicles of this type, in order to bring the lubricant up to its ideal service temperature, it is additionally provided that the lubricant flows through at least part of the synchronous machine. By this arrangement, heat-up of the lubricant by thermal losses in the synchronous machine, specifically current-related thermal losses, is possible.

However, according to the designs employed for vehicles of this type to date, it is provided that the synchronous machine consistently operates as efficiently as possible, preferably in an energy-efficient manner. During this optimum operation, by definition, only very limited thermal losses, specifically current-related thermal losses, occur in the synchronous machine, as a result of which the lubricant only heats up very slowly, or is only very slowly brought up to its ideal service temperature. However, in specific operating states of the vehicle, this procedure is not ideal, e.g. in the event of a cold start-up, or during a consecutive starting phase, particularly if the ambient temperature or the prevailing temperature in the gearbox is low. In these operating states, on the grounds of the non-optimum service temperature of the lubricant, friction losses within the gearbox, and consequently mechanical wear, are increased. This impacts negatively upon the service life of individual components or of the gearbox per se, and upon the endurance of the lubricant. This can even apply to the extent that the overall range of the vehicle is adversely affected as a result.

One object of the present invention is therefore the disclosure of a device, by means of which, in a vehicle which is equipped with a synchronous machine, by means of which a driving torque can be generated on the driven wheels of the vehicle, sustainable operation is possible, specifically whereby, for the gearbox via which the synchronous machine is in operative connection with the driven wheels, a longer service life is achieved and/or a longer endurance of the lubricant employed for the lubrication of the gearbox is achieved and/or a longer overall range of the vehicle is achieved. A further object of the present invention is the disclosure of a corresponding method.

This object, in a vehicle having a synchronous machine which is designed to drive driven wheels of the vehicle via a gearbox and wherein, additionally, a lubrication device is provided, which is designed to lubricate the gearbox by means of a lubricant wherein, to this end, the lubricant flows through the gearbox and at least part of the synchronous machine, is fulfilled by a device for activating the synchronous machine, which is designed, in the presence of a specific heat start-up condition, to operate the synchronous machine in a heating operating mode which differs from a customary driving operating mode, wherein, in the heating operating mode, at least one operating variable of the synchronous machine is deliberately set such that, in the synchronous machine, in comparison with the customary driving operating mode, a greater current-related thermal loss is generated, thereby heating the lubricant in the heating operating mode.

The object is further fulfilled, in a vehicle described above, by a method for activating a synchronous machine arranged in the vehicle, wherein the following steps are executed: determination of a specific heat start-up condition, and operation of the synchronous machine in a heating operating mode which differs from a customary driving operating mode, in the presence of the specific heat start-up condition wherein, to this end, at least one operating variable of the synchronous machine is deliberately set such that, in the synchronous machine, in comparison with the customary driving operating mode, a greater current-related thermal loss is generated, thereby heating the lubricant during the heating operating mode.

In the presence of a specific heat start-up condition, the synchronous machine is operated in a heating operating mode, which differs from a customary driving operating mode. The customary driving operating mode can also be described as a normal operating mode. In both operating modes, a driving torque can be generated on the driven wheels of the vehicle by the synchronous machine. However, the two operating modes differ with respect to the current-related thermal losses generated in the synchronous machine. In the customary driving operating mode, the synchronous machine is activated such that it operates as efficiently as possible, preferably in an energy-efficient manner, as a result of which a minimal current-related thermal loss is generated in the synchronous machine, thereby resulting in a low thermal loss. Conversely, in the heating operating mode, an operating variable of the synchronous machine is deliberately set such that a current-related thermal loss occurs in the synchronous machine, which is greater than the current-related thermal loss generated in the customary driving operating mode. During the heating operating mode, it is deliberately accepted that the synchronous machine is operated at a reduced overall efficiency, and thus with additional losses, as the rapid warming or heat-up of the lubricant to its optimum service temperature is possible as a result.

The reduced overall efficiency of the synchronous machine can be accepted, both economically and ecologically. Economically, the short-term impairment of overall efficiency provides a pay-off, in that it permits the more rapid achievement of the optimum service temperature of the lubricant, and thus permits the achievement of a longer service life for the gearbox and/or the achievement of greater endurance of the lubricant provided for the lubrication of the gearbox and/or the achievement of a greater overall range by the vehicle. In ecological terms, operation of the synchronous machine with impaired overall efficiency is acceptable, as this only occurs for a short time. Mechanical wear of the gearbox is reduced by this proposed measure. Likewise, in the event of operating conditions which are perceived as problematic, specifically in the event of a cold start-up at low ambient temperatures or with a low prevailing temperature in the gearbox, an advantageous overall energy balance can be achieved. Overall, in a vehicle which is equipped for the generation of driving torques by a synchronous machine, sustainable operation can be achieved. A further advantage is provided, in that this measure can be implemented with no additional hardware expenditure, and thus with very low costs. Moreover, this measure contributes to the improvement of the quality and robustness of the gearbox, thus delivering a positive outcome for the user of the vehicle. This measure is also characterized in that the driver experiences no impairment of driving performance associated with said measure.

The above-mentioned object is completely fulfilled accordingly.

The synchronous machine considered is an internal-rotor machine, having a stator and a rotor. As a synchronous machine, the employment of a current-excited synchronous machine has proved to be particularly advantageous. Conversely to a permanently-excited synchronous machine, a current-excited synchronous machine features no permanent magnets for the generation of a rotor magnetic field in the rotor, but the rotor incorporates a rotor winding for this purpose. The rotor magnetic field is thus generated in response to a rotor current flowing in the rotor winding. In the operation of a synchronous machine, this rotor current constitutes an additional degree of freedom, as it permits the achievement or adjustment of targeted ancillary effects, with no perceptible impairment to the vehicle driver of the performance of their vehicle during the operation of the synchronous machine, and thus of the vehicle.

Consequently, the operating variable considered is the rotor current flowing in the rotor winding. According to the invention, the degree of freedom in the rotor current is employed in order to operate the synchronous machine in a non-efficient manner during the heating operating mode, i.e. to generate higher current-related thermal losses in the synchronous machine, or more accurately in the rotor thereof, than in the customary driving operating mode of the synchronous machine, but with no resulting negative impact upon torque generation, i.e. upon the driving torque can be generated on the driven wheels by the synchronous machine. This means that the driver is unaware of the measure according to the invention, whereby the more rapid heat-up of the lubricant is achieved by a deliberately initiated inefficient operation of the synchronous machine during the heating operating mode. The driver perceives no unaccustomed influence upon the driving performance of their vehicle. By this measure, rotor copper losses are deliberately generated.

Advantageously, the rotor current in the heating operating mode is increased, in comparison with the customary driving operating mode. As a result, current-related thermal losses in the rotor of the synchronous machine are increased, thus permitting the more rapid heat-up of the lubricant. By means of this measure, overall losses occurring in the synchronous machine are displaced from the stator to the rotor.

It is particularly advantageous if, additionally, in the heating operating mode, a stator current flowing in the stator is reduced, in relation to the customary driving operating mode. The stator current generates a stator magnetic field, which is a rotary field, in response to which the rotor, as a result of its rotor magnetic field, executes a rotary motion. This measure is implemented on the following grounds: during the heating operating mode, the magnetic flux in the synchronous machine increases in response to the increased rotor current. On the basis of an applicable torque equation for a current-excited synchronous machine, the stator current, or more accurately the torque-generating stator current component, can be reduced in a corresponding manner. Overall, current-related thermal losses are consistently displaced from the stator to the rotor as a result, with no resulting influence upon the driving torque, and thus upon the driving performance of the vehicle, which is perceptible to the driver. Accordingly, the energization of the synchronous machine, which is undertaken in the interests of the more rapid heat-up of the lubricant, is not perceptible with respect to its impact upon torque.

In a preferred embodiment of the invention, the rotor incorporates a rotor shaft which is configured as a hollow shaft. This measure permits the particularly effective heat-up of the lubricant given that, by means of the hollow shaft, the lubricant can virtually be routed through the rotor, and thus directly to that location where, during the heating operating mode, additional current-related thermal losses are generated or occur. The lubricant can thus be brought to its optimum service temperature by the current-related thermal losses occurring in the rotor in a particularly rapid manner. Moreover, in the customary driving operating mode, this measure also permits the particularly effective cooling of the rotor, such that any overheating of the rotor, and thus of the synchronous machine, can be prevented accordingly in a particularly effective manner.

The lubrication device arranged in the vehicle comprises a lubricant circuit, and a lubricant pump arranged therein. The lubricant pump is designed to convey the lubricant through the lubricant circuit in a specific direction of flow. Moreover, the synchronous machine and the gearbox are also constituent elements of the lubricant circuit, such that both components receive a flow of the lubricant, according to the direction of flow thereof. Advantageously, relative to the direction of flow, the gearbox is arranged downstream of the synchronous machine. In other words: the lubricant flows firstly through the synchronous machine, and then through the gearbox. By this measure, it is ensured that, in the event of operating conditions which are perceived as problematic, in which, on the grounds of the non-optimum service temperature of the lubricant within the gearbox, high friction losses resulting in excessive mechanical wear occur, these losses are very rapidly reduced to a degree which is acceptable for the sustainable operation of the gearbox, and thus of the vehicle. The service life of individual components or of the gearbox can thus be influenced in a particularly positive manner, and the overall range of the vehicle can be particularly effectively increased.

In a further advantageous configuration of the invention, in the presence of a specific heat-stop condition, the synchronous machine operates in the customary driving operating mode. By this measure, it is ensured that the synchronous machine only operates in the heating operating mode, and thus at a reduced overall efficiency, for such time as is absolutely necessary. The heating operating mode is thus restricted to a minimum duration, for example to a time interval within which the lubricant has achieved its optimum service temperature. Accordingly, sustainable operation of the synchronous machine is also ensured from an ecological viewpoint. Additional losses generated in the synchronous machine are thus restricted to a minimum.

In a further advantageous configuration of the invention, the synchronous machine and the gearbox constitute a structural unit. Preferably, the two components are securely mutually attached, but in a detachable manner. A secure mechanical assembly is thus provided, which can nevertheless be broken down into its two constituent components, for example for servicing purposes. The synchronous machine and the gearbox constitute a drive train, configured in accordance with an IFEP topology (integrated full electric propulsion topology); the gearbox and the synchronous machine are constituent elements of the drive train. The drive train as a whole is thus lubricated by the lubricant.

The lubricant can be, for example, a fluid, preferably an oil, which is also described as a lubricating oil. By means of the lubricant, components of the gearbox, specifically those components which move relatively to one another during operation of the gearbox, are lubricated and/or cooled. By means of the device according to the invention, or the method according to the invention, it is possible to bring the viscosity of the lubricant to an advantageous value within an exceptionally short time, for example further to a cold start-up.

Advantageously, it is provided that the synchronous machine, both in the heating operating mode and in the customary driving operating mode which proceeds immediately thereafter, delivers the same torque, i.e. a torque of equal value, to the driven wheels. It is thus ensured that the driver of the vehicle does not perceive any change between these two operating modes.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
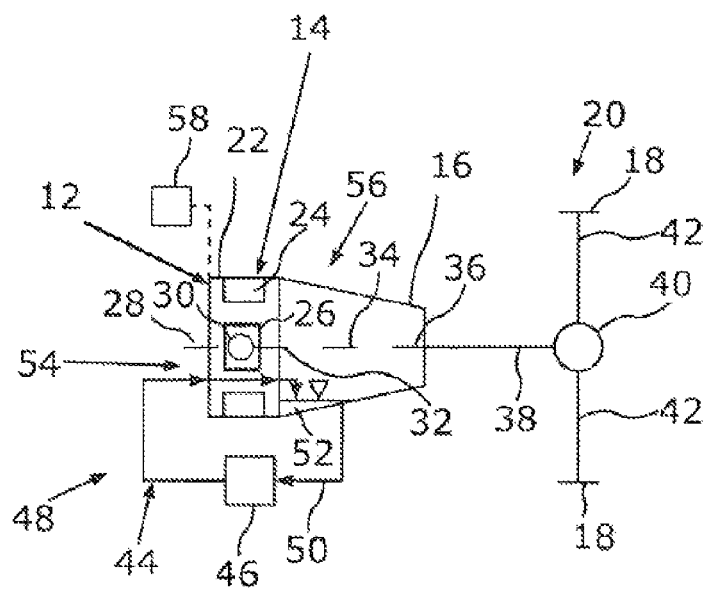
FIG. 1 is a schematic representation of a drive train comprising a synchronous machine and a gearbox, in which the device according to the invention or the method according to the invention are employed.

FIG. 1 shows a schematic representation of a drive train 12 arranged in a vehicle 10, wherein the vehicle 10 is not fully represented. The drive train 12 comprises a synchronous machine 14 and a gearbox 16, wherein the synchronous machine 14 and the gearbox 16 advantageously constitute a structural unit. The vehicle 10 further comprises driven wheels 18, which are in operative connection with the gearbox 16. The synchronous machine 14 is designed to drive the driven wheels 18 via the gearbox 16. The driven wheels 18 form part of an axle 20, which can be either a front axle or a rear axle. The synchronous machine 14 incorporates a housing 22, to which a stator 24 of the synchronous machine 14 is attached. The synchronous machine 14 further comprises a rotor 26, which is rotatably mounted about an axis of rotation 28 relative to the stator 24 and relative to the housing 22. The synchronous machine 14 is a current-excited synchronous machine, and the rotor 26 incorporates a rotor winding 30 accordingly. By the appropriate energization of the rotor winding 30, a rotor magnetic field is generated which, by a reciprocal action with a stator magnetic field generated by the stator, moves the rotor 26 in rotation.

The rotor 26 is non-rotatably attached to a rotor shaft 32. The gearbox 16 comprises a first gearbox shaft 34 in the form of an input shaft, and a second gearbox shaft 36 in the form of an output shaft, wherein both shafts are mutually operatively connected. The first gearbox shaft 34 is non-rotatably attached to the rotor shaft 32. The second gearbox shaft 36 is likewise non-rotatably attached to a further shaft 38, wherein the further shaft 38 is in operative connection with a differential gearbox 40 assigned to the axle 20, which can be configured as a compensating gearbox. The differential gearbox 40 is, in turn, coupled to axle shafts 42, by means of which the driven wheels 18 are drivable. The axle shafts 42 can be configured as articulated shafts. The above-mentioned shafts and the differential gearbox 40 constitute an active chain via which, during motor operation, the driven wheels are driven by the synchronous machine 14, and via which, in generator operation, the synchronous machine 14 is driven by the driven wheels 18.

A high-voltage supply unit, which is preferably configured as a high-voltage store, and by means of which the synchronous machine 14, in motor operation, is supplied with electrical energy or which, in generator operation, can store electrical energy, is not represented in FIG. 1, for reasons of clarity. Moreover, in FIG. 1, the following components are likewise not represented: an actuation unit, by means of which an inverter is actuatable, via which the synchronous machine is connectable to the high-voltage supply unit, in order to supply the synchronous machine with electric current, for example in a customary driving mode, such that a drive torque is generated on the driven wheels 18, in accordance with the driver's instruction.

The vehicle 10 further incorporates a lubrication device 44, which is designed to lubricate the gearbox 16 by means of a lubricant wherein, to this end, the lubricant flows through the gearbox 16 and at least part of the synchronous machine 14. The lubricant can be, for example, a lubricating oil. The lubrication device 44 comprises a lubricant pump 46, which can be configured as an oil pump. The lubricant pump 46 is designed to convey the lubricant in a specific direction of flow through or within a lubricant circuit 48 wherein, in FIG. 1, the direction of flow is indicated by arrows, one of which is identified by the reference symbol 50. As can be seen from the representation shown in FIG. 1, the synchronous machine 14 and the gearbox 16, as an element of the lubricant circuit 48, receive a flow of the lubricant, wherein the gearbox 16, with respect to the direction of flow, is arranged downstream of the synchronous machine 14. Consequently, the lubricant flows firstly through the synchronous machine 14, and thereafter through the gearbox 16. For the purposes of the conveyance of a flux through the synchronous machine 14, the rotor shaft 32 of the rotor 26 is configured as a hollow shaft, i.e. the lubricant flows within the synchronous machine 14 through the rotor shaft 32. Overall, the components of the gearbox 16 are supplied with the lubricant, whereby said components are lubricated and/or cooled. In the gearbox 16, the lubricant collects in a lubricant sump 52, from which it is extracted by means of the lubricant pump 46 and redirected to the synchronous machine 14.

The synchronous machine 14 comprises a first side 54 and a second side 56, wherein the second side 56, in an axial direction of the synchronous machine 14, is arranged in opposition to the first side 54. The axial direction of the synchronous machine 14, and thus of the gearbox 16, coincides with the axis of rotation 28. The second side 56 is an "A-side" of the synchronous machine 14, on which the synchronous machine 14 delivers the torque for the propulsion of the driven wheels 18. The first side 54 is customarily described as the "B-side". Accordingly, the lubricant flows from the first side 54 of the synchronous machine 14 through the second side 56 into the gearbox 16, lubricates the latter and collects in the lubricant sump 52, from whence it is extracted by the lubricant pump 46 and is conveyed back through the lubricant circuit 48 to the first side 54.

As indicated above, the vehicle 10 can be configured as an electric or a hybrid vehicle wherein, in the case of a hybrid vehicle, a combustion engine and further components are to be included in FIG. 1.

In the vehicle, a device 58 is further arranged which, in the presence of a specific heat start-up condition, is designed to operate the synchronous machine 14 in a heating operating mode which differs from a customary driving operating mode. In the heating operating mode, the device 58 deliberately sets at least one operating variable on the synchronous machine 14 such that, in comparison with the customary driving operating mode, a higher current-related thermal loss is generated in the synchronous machine 14, thereby heating the lubricant during the heating operating mode. As already indicated, the synchronous machine 14 is intended to be a current-excited synchronous machine, such that a rotor current flowing in the rotor winding 30 can be employed as an operating variable. During the heating operating mode, the rotor current is increased, in comparison with the customary driving operating mode. At the same time, in the heating operating mode, a stator current flowing in the stator is reduced, in comparison with the customary driving operating mode. The device 58 is further designed, in the presence of a specific heat-stop condition, to specifically restore the operation of the synchronous machine to the customary driving operating mode. This means that the rotor current is reduced to a customary normal value, and the stator current is increased to a customary normal value. The method according to the invention is executed in the device 58.

With respect to the device 58, various concrete embodiments are contemplated. Firstly, this can be a standalone computing unit or a standalone control unit. In a preferred manner, this can also be a functional module, which is integrated in the above-mentioned actuation device.

The presence of a heat start-up condition can be detected, for example, where a cold start-up or a start-up process proceeds at low ambient temperatures or a low prevailing temperature on the gearbox. To this end, for example, it is possible to undertake the detection and evaluation of a driving operating command executed by the driver, corresponding to the "ignition on" signal which is available for evaluation in an exclusively combustion engine-driven vehicle, together with a temperature value which is representative of the ambient temperature and/or a temperature value which is representative of the gearbox temperature. Both temperature values can be compared with respectively associated and specific temperature values, from which it can be inferred that the lubricant is being employed below its optimum service temperature, and thus shows an increased viscosity. The presence of a heat-stop condition can, for example, be detected where the prevailing temperature in the gearbox exceeds a specific temperature value which represents an optimum service temperature of the lubricant. For reasons of clarity, the corresponding sensors or detection means required for this purpose have been omitted from the representation shown in FIG. 1. At this point, it should be observed that the temperature can not only be detected using a hardware component, for example in the form of a sensor, but can also be detected by a software-based method, for example by the employment of an appropriate model or observer program.

Figure 2:
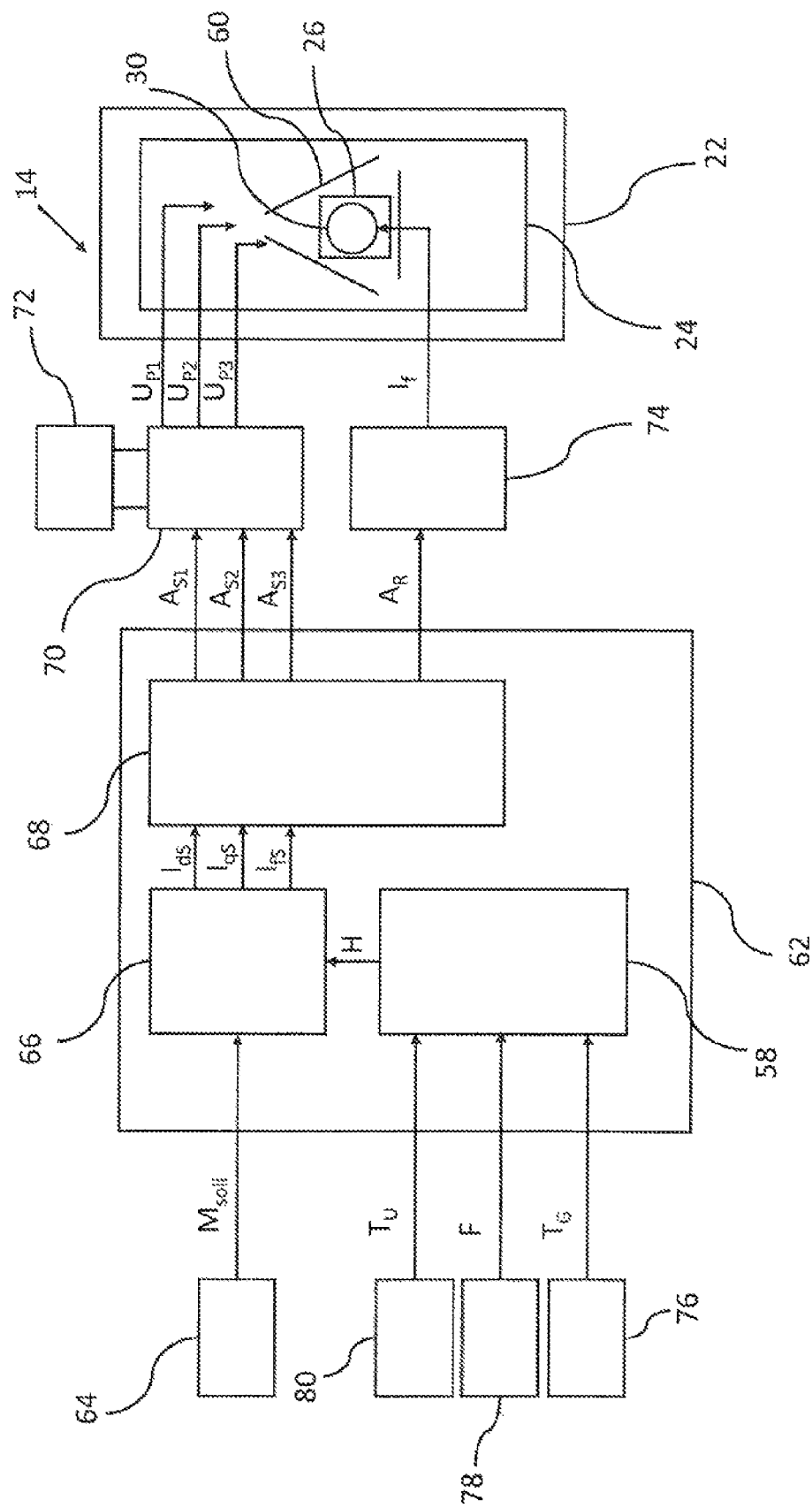
FIG. 2 is a schematic representation for the clarification of the operating strategy which is fundamental to the method according to the invention.

FIG. 2 shows a schematic representation for the clarification of the operating strategy which is fundamental to the method according to the invention. A current-excited synchronous machine 14 is represented, comprising a housing 22, and a stator 24 and a rotor 26 arranged therein. The rotor 26 comprises a rotor winding 30. The stator comprises stator windings, one of which is identified by the reference symbol 60.

According to the representation shown in FIG. 2, the device 58 according to the invention is deployed in an actuation device 62, although this is not to be considered by way of limitation. Naturally, the device 58 can also be configured as a standalone component. The function of the actuation device 62, according to a target torque $M_{soll}$ delivered by a target value selection unit 64, is to establish actuation signals $A_{S1}$, $A_{S2}$, $A_{S3}$ and $A_R$ for the operation of the synchronous machine 14. The target torque $M_{soll}$ can correspond to a driver command, which is dictated by the driver of the vehicle 10 by the corresponding actuation of an (unrepresented) driver pedal, or can correspond, for example, to a system input, which is established by a (likewise unrepresented) slip control unit which is incorporated in the vehicle, wherein said unit can be, for example, a drive-slip control unit or a yaw rate control unit. The target torque $M_{soll}$ can also be constituted as a combination of these two inputs.

On the basis of the target torque $M_{soll}$ target current values $I_{dS}$ $I_{qS}$ and $I_{fS}$ are determined in a target current unit 66. The two target current values $I_{dS}$ and $I_{qS}$ relate to the stator magnetic field generated by the stator windings 60, which is a rotary magnetic field. The determination of these two target values is based upon a "field-oriented" control or vector control approach. According to this approach, in a synchronous machine of three-phase design, the stator-related three-phase coordinate system is mapped by the application of "Clarke's transformation" and "Park's transformation" to a rotor-related two-phase coordinate system. The two mutually orthogonal axes in this coordinate system are designated as d and q, wherein the value of the d-axis represents the magnetic flux density, and the value of the q-axis represents the torque. Accordingly, $I_{dS}$ corresponds to the target value of the field-forming current component $I_d$, and $I_{qS}$ corresponds to the target value of the torque-forming current component $I_q$. The target current value $I_{fS}$ relates to the rotor magnetic field generated by means of the rotor winding 30, wherein this is the target value for the rotor current $I_f$ flowing in the rotor winding. The two current components $I_d$ and $I_q$, together with the rotor current $I_f$, constitute operating variables of the synchronous machine. In a conversion unit 68, which is arranged down-circuit of the target current unit 66, on the basis of the two target current values $I_{dS}$, $I_{qS}$, actuation signals $A_{S1}$, $A_{S2}$, $A_{S3}$ are generated, which are routed to an inverter 70. The inverter 70 comprises a plurality of inverter switches, which are arranged to form a full bridge which is designed for three-phase operation. The inverter switches can be, for example, MOSFET transistors or IGBTs. According to the actuation signals $A_{S1}$, $A_{S2}$, $A_{S3}$, the individual stator windings 60 are connected to a high-voltage store 72, such that the phase voltages $U_{P1}$, $U_{P2}$, $U_{P3}$ are applied to the individual stator windings 60. In the conversion unit 68, likewise on the basis of the target current value $I_{fS}$, actuation signals $A_R$ are generated, which are routed to a down-circuit current source 74, by means of which the rotor current $I_f$ flowing in the rotor winding 30 is set accordingly.

The device 58 is designed, in the presence of a specific heat start-up condition, to operate the synchronous machine 14 in a heating operating mode which differs from a customary driving operating mode. In the heating operating mode, at least one operating variable of the synchronous machine 14, preferably the rotor current $I_f$ flowing in the rotor winding 30, is deliberately set such that, in comparison with the customary driving operating mode, a greater current-related thermal loss is generated in the synchronous machine 14, as a result of which the lubricant flowing through the gearbox 16 and the synchronous machine 14 is heated up during the heating operating mode. In order to achieve the heat-up of the lubricant, the rotor current $I_f$ in the heating operating mode is increased in relation to the customary driving operating mode. To this end, a target current value $I_{fS}$ delivered by the target current unit 66 is increased in relation to the customary driving operating mode. Additionally, it can be provided that the stator current flowing in the stator is reduced in relation to the customary driving operating mode or, more accurately, that a reduced current flows in the stator windings 60. To this end, the target current unit 66 delivers a reduced target value $I_{qS}$ for the torque-forming current component $I_q$, in relation to the customary driving operating mode. The device 58 is further designed, in the presence of a specific heat-stop condition, to restore the operation of the synchronous machine 14 to the customary driving operating mode. To this end, the target current unit 66 once more delivers a target current value $I_{fS}$ which is reduced to the normal magnitude, and a target value $I_{qS}$ which is increased to the normal magnitude.

The device 58 is designed to establish whether a heat start-up condition or a heat-stop condition is present. Different variables or signals are evaluated in the device 58 for this purpose. Accordingly, to this end, a temperature value $T_G$ which is representative of the temperature of the gearbox can be routed to the device 58 from a first temperature sensor 76. From a detection unit 78, a signal F can be routed to the device 58, which represents a driving operating command executed by the driver of the vehicle. The detection unit 78 can be configured to a hardware-based or software-based design, for example in the form of a model or an observer program.

For example, a heat start-up condition can be present, if a driving operating command F is in force and, simultaneously, the temperature value $T_G$ is lower than a first low comparative temperature value, which constitutes an indication to the effect that, at the start of driving, a temperature in the gearbox 16 is prevailing at which the lubricant does not assume its optimum service temperature, in consequence whereof measures are required for the heat-up of the lubricant. A heat-stop condition can be present, for example, if the temperature value $T_G$ is greater than a second comparative temperature value, wherein the second comparative temperature value is greater than the first temperature value. If this comparative condition is fulfilled, this constitutes an indication to the effect that, at the prevailing temperature in the gearbox 16, the lubricant has achieved its optimum service temperature. Measures initiated for the heat-up of the lubricant can thus be discontinued. Additionally, by means of a second temperature sensor 80, a temperature value $T_U$ can be delivered which is representative of the ambient temperature of the vehicle, and is likewise delivered to the device 58. As an alternative to the employment of a sensor, it is also possible to determine the ambient temperature by a software-based method, for example by the application of a model or an observer program. This permits the heat-up of the lubricant to be modified in accordance with the prevailing ambient temperature. It is thus conceivable, in the event of an exceptionally low ambient temperature, to set a higher rotor current than in the case of a higher ambient temperature. The result of evaluations executed in the device 58 is delivered to the target current unit 66 in the form of a variable H.

In order to permit the determination of the target current values $I_{dS}$, $I_{qS}$ and $I_{fS}$, lookup tables can be saved in the target current unit 66, from which the respective target current values $I_{dS}$, $I_{qS}$ and $I_{fS}$ are read-off, according to the target torque $M_{soll}$. It can be provided that two series of lookup tables are saved, wherein a first series is to be applied in the event of a customary driving mode, and a second series is to be applied in the event of a heating operating mode. Alternatively, it is conceivable that modified values for the target current value $I_{fS}$ and the target value $I_{qS}$, to be applied in the event of the heating operating mode, are determined from values extracted from a lookup table which is valid for the customary driving operating mode, by means of an analytical approach involving the application of machine equations.

The torque generated by a current-excited synchronous machine can be described by the following torque equation:

$$M = 3/2 * z_p * (L_{md} * I_f * I_{qs} + (L_{ds} - L_{qs}) * I_{ds} * I_{qs})$$

The variables employed in this equation signify the following: $z_p$=pole pair number; $I_{qs}$=q-axis current component; $I_{ds}$=d-axis current component; $I_f$=rotor current; $L_{md}$=rotor inductance; $L_{qs}$=q-axis stator inductance; $L_{ds}$=d-axis stator inductance. This torque equation permits the clarification of the physical context. If the rotor current $I_f$ is increased, in order to generate greater current-related thermal losses in the rotor winding, there is a simultaneous increase in the torque generated by the current-excited synchronous machine. Consequently, the q-axis-dependent current component $I_{qs}$ can be reduced in a corresponding measure, such that no variation in the driving performance of the vehicle is perceived by the driver.

The rotor current-related thermal losses in the rotor winding of a current-excited synchronous machine can be described as follows:

$$P_{v,Cu} = R_r * I_f^2,$$

where $R_r$ represents the resistance of the rotor winding. As this equation shows, on the grounds of quadratic regularity, even small increases in the rotor current are sufficient to generate a significant increase in current-related thermal losses. It is additionally advantageous that, by means of an increase in the temperature of the rotor winding, the electrical resistance of the constituent wire of the rotor winding increases, thereby delivering an amplification effect.

Figure 3:
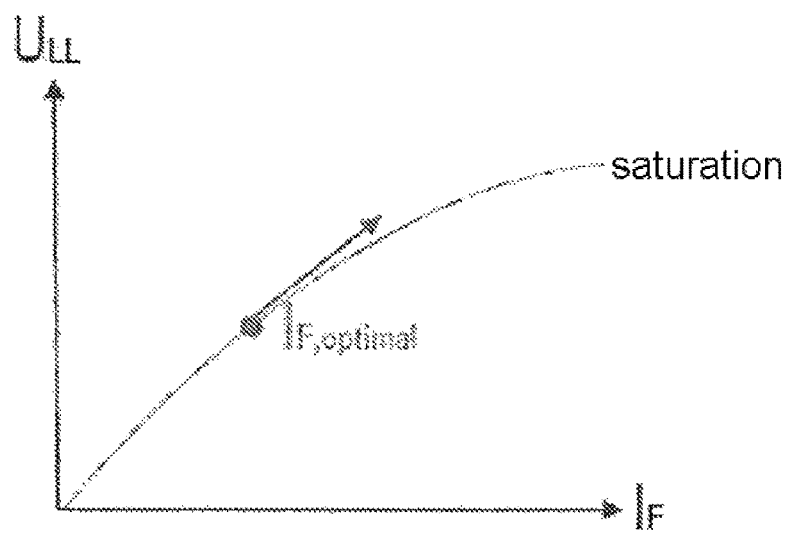
FIG. 3 shows a no-load characteristic for a current-excited synchronous machine.
Figure 4:
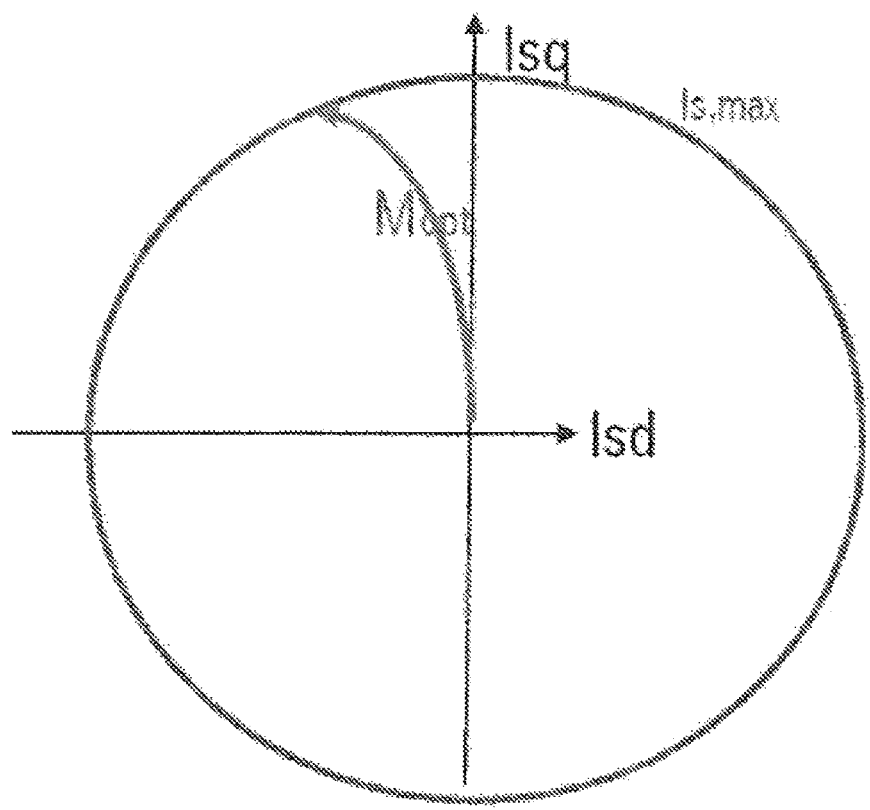
FIG. 4 shows a stator current diagram.

FIG. 3 shows a no-load characteristic for a current-excited synchronous machine. In the customary driving operating mode, the current-excited synchronous machine is customarily operated with the optimum rotor current $I_{f,optimal}$. In the heating operating mode, the rotor current is varied, as indicated by the arrow, such that a greater magnetic flux is produced, whereby greater current losses are generated in the rotor, and lower current-related thermal losses are generated in the stator. FIG. 4 shows a stator current diagram, which is valid for a current-excited synchronous machine. From this diagram it can be inferred that, for any rotor current $I_f$, an efficiency-optimized target current input is given for each respective target torque value.

The synchronous machine can be operated in both motor mode and generator mode. In motor mode, the synchronous machine is supplied with an electric current which, for example, is sourced from a high-voltage store, wherein electrical energy is converted into mechanical energy, such that a torque for the propulsion of the vehicle can be delivered to the driven wheels. In generator mode, the synchronous machine is driven by means of the driven wheels, wherein mechanical energy is converted into electrical energy, which can then be stored, for example, in the high-voltage store.

Although, heretofore, the employment of the device or the method according to the invention has consistently been described with reference to a vehicle, or involves a synchronous machine, by means of which a drive torque is generated on driven wheels of a vehicle, this is not to be considered by way of limitation. Naturally, other applications are also conceivable, either within a vehicle or externally to a vehicle. With regard to vehicle-related application, this can apply to a vehicle with two, three, four or even more wheels.

Although reference has previously been made specifically to a current-excited synchronous machine of three-phase design, this is not to be considered by way of limitation. Naturally, all information presented is equally valid for current-excited synchronous machines having more than three phases.

LIST OF REFERENCE SYMBOLS

10 Vehicle
12 Drive train
14 Synchronous machine
16 Gearbox
18 Driven wheel
20 Axle
22 Housing
24 Stator
26 Rotor
28 Axis of rotation
30 Rotor winding
32 Rotor shaft
34 First gearbox shaft
36 Second gearbox shaft
38 Further shaft
40 Differential gearbox
42 Axle shaft
44 Lubrication device
46 Lubricant pump
48 Lubricant circuit
50 Arrow
52 Lubricant sump
54 First side
56 Second side
58 Device
60 Stator winding
62 Actuation device
64 Target value selection unit
66 Target current unit
68 Conversion unit
70 Inverter
72 High-voltage store
74 Current source
76 First temperature sensor
78 Detection unit
80 Second temperature sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for activating a synchronous machine arranged in a vehicle equipped with a gearbox and driven wheels in operative connection therewith, wherein the synchronous machine is configured to drive the driven wheels via the gearbox, comprising:
   a lubrication device provided in the vehicle, which is designed to lubricate the gearbox via a lubricant that flows through the gearbox and at least part of the synchronous machine, wherein the lubrication device is configured such that, in the presence of a specific heat start-up condition, the synchronous machine is operated, in a heating operating mode which differs from a customary driving operating mode, wherein,
   in the heating operating mode, at least a rotor current flowing in a rotor winding of the synchronous machine is deliberately set such that, in the synchronous machine, in comparison with the customary driving operating mode, a greater current-related thermal loss is generated, whereby heating of the lubricant occurs during the heating operating mode; and
   in the heating operating mode, the rotor current is increased in relation to the customary driving operating mode.

2. The device as claimed in claim 1, wherein the synchronous machine is a current-excited synchronous machine, comprising a stator and the rotor.

3. The device as claimed in claim 2, wherein
   the rotor incorporates a rotor shaft which is configured as a hollow shaft.

4. The device as claimed in claim 1, wherein in the heating operating mode, a stator current flowing in the stator is reduced in relation to the customary driving operating mode.

5. The device as claimed in claim 1, wherein
   the lubrication device comprises a lubricant pump arranged in a lubricant circuit,
   the lubricant pump conveys the lubricant through the lubricant circuit in a specific direction of flow,
   the synchronous machine and the gearbox, as elements of the lubricant circuit, receive a flow of the lubricant, and relative to a direction of flow, the gearbox is arranged downstream of the synchronous machine.

6. The device as claimed in claim 1, wherein
in the presence of a specific heat-stop condition, the synchronous machine operates in the customary driving operating mode.

7. The device as claimed in claim 1,
the synchronous machine and the gearbox constitute a structural unit.

8. The device as claimed in claim 1, wherein
the rotor current of the synchronous machine is deliberately set based on a determined target torque.

9. A method for activating a synchronous machine arranged in a vehicle, wherein the vehicle incorporates a gearbox and driven wheels in operative connection therewith, wherein the synchronous machine is configured to drive the driven wheels via the gearbox, wherein a lubrication device is provided in the vehicle, which is configured to lubricate the gearbox via lubricant flow through the gearbox and at least part of the synchronous machine, the method comprising the steps of:

determining a specific heat start-up condition; and
operating the synchronous machine in a heating operating mode which differs from a customary driving operating mode, in the presence of the specific heat start-up condition wherein,
in the heating operating mode, at least a rotor current flowing in a rotor winding of the synchronous machine is deliberately set such that, in the synchronous machine, in comparison with the customary driving operating mode, a greater current-related thermal loss is generated, thereby heating the lubricant in the heating operating mode, and
in the heating operating mode, the rotor current is increased in relation to the customary driving operating mode.

10. The device as claimed in claim 9, wherein
the rotor current of the synchronous machine is deliberately set based on a determined target torque.

\* \* \* \* \*